(12) United States Patent
Burg

(10) Patent No.: US 7,073,302 B2
(45) Date of Patent: Jul. 11, 2006

(54) WALL AND PARTITION CONSTRUCTION AND METHOD USING HAT-CHANNEL MEMBERS

(75) Inventor: John Parker Burg, Cupertino, CA (US)

(73) Assignee: Strawmen L.P., Whitewright, TX (US)

( * ) Notice: Subject to any disclaimer, the term of this patent is extended or adjusted under 35 U.S.C. 154(b) by 449 days.

(21) Appl. No.: 10/715,258

(22) Filed: Nov. 17, 2003

(65) Prior Publication Data

US 2005/0102969 A1    May 19, 2005

(51) Int. Cl.
*E04C 2/34* (2006.01)
(52) U.S. Cl. ............... 52/481.1; 52/483.1; 52/783.1
(58) Field of Classification Search ................ 52/479, 52/474, 475.1, 481.1, 481.2, 483.1, 772, 52/585.1, 731.1, 281, 783.1
See application file for complete search history.

(56) References Cited

U.S. PATENT DOCUMENTS

| | | | |
|---|---|---|---|
| 3,724,156 A | 4/1973 | Helmerson | |
| 4,178,047 A | 12/1979 | Welch | |
| 4,326,356 A | 4/1982 | Mason | |
| 4,408,427 A * | 10/1983 | Zilch | 52/481.2 |
| 4,584,808 A * | 4/1986 | Wendt | 52/481.1 |
| 4,976,079 A | 12/1990 | Liljergren | |
| 5,092,100 A * | 3/1992 | Lambert et al. | 52/774 |
| 5,361,556 A | 11/1994 | Menchetti | |
| 5,692,356 A | 12/1997 | Baxter | |
| 5,749,199 A | 5/1998 | Allen | |
| 5,937,588 A | 8/1999 | Gard | |
| 5,987,842 A | 11/1999 | Klein | |
| 5,996,299 A * | 12/1999 | Hsueh | 52/481.2 |
| 6,061,986 A | 5/2000 | Canada | |
| 6,131,365 A | 10/2000 | Crockett | |
| 6,360,510 B1 | 3/2002 | Woodrum | |
| 6,993,875 B1 * | 2/2006 | Rudduck | 52/474 |

* cited by examiner

*Primary Examiner*—Naoko Slack
*Assistant Examiner*—Jessica Laux
(74) *Attorney, Agent, or Firm*—Robert W. Brown; Robert H. Frantz

(57) ABSTRACT

An improved wall and partition construction method that is more time and cost efficient to construct than conventional methods, and that includes no exterior attachment means, thus providing a finished wall with a substantially seemless first and second surface. The improved wall is constructed by attaching rigid panels to a series of channel members each having a hat-shaped cross section generally placed in vertical orientation, along the centerline of a wall. Each channel member includes a plurality of openings that provide an interior pathway for routing utility and communication cables, and/or for containing supplemental insulation. Compressed straw panels are attached to the channel members in a slightly offset alternating manner such that each panel can be rigidly connected to a channel member by a plurality of lag screws with each penetrating the panel from the inside such that the finished wall has no exterior penetrations.

10 Claims, 19 Drawing Sheets

PRIOR ART

PRIOR ART

PRIOR ART

WALL AND PARTITION CONSTRUCTION AND METHOD USING HAT-CHANNEL MEMBERS

BACKGROUND OF THE INVENTION

In modern office buildings, business and conference centers, hotels, classrooms, medical facilities, and the like, the fitting-out of occupiable space is continuously becoming more important and ever more challenging. In the competitive business environment, cost concerns alone dictate the efficient use of interior space. Thus, the finishing or fitting-out of building spaces for offices, hotel rooms, and similar areas has become a very important aspect of effective space planning and layout.

Business organizations, their work patterns and the technology utilized therein are constantly evolving and changing. Building space users require products that provide for change at minimal cost. At the same time, their need for functional interior accommodations remains steadfast. Issues of privacy, functionality, aesthetics, acoustics, etc. are unwavering. For architects and designers, space planning for both the short and long term is a dynamic and increasingly challenging problem. Changing work processes and the technology required demand that designs and installation be able to support and anticipate change.

Space allocation and planning challenges are largely driven by the fact that modern office spaces are becoming increasingly more complicated due to changing and increasing needs of users for more and improved utilities support at each workstation or work setting. These utilities encompass all types of resources that may be used to support or service a worker, such as communications and data used with computers and other types of data processors, telecommunications, electronic displays, etc., electrical power, conditioned water, and physical accommodations, such as lighting, HVAC, sprinklers, security, sound masking, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will need to be accommodated in the work places of the future. Moreover, the office space layout of these "knowledge workers" changes frequently to accommodate new technology, or to accommodate changing work teams resulting from changing business objectives, changing corporate cultures, or a combination thereof.

Office workers today need flexible alternative products that provide for the obtainment of numerous, often seemingly conflicting objectives. For example, the cultural aims of an organization may require the creation of both individual and collaborative spaces, while providing a "sense of place" for the users, and providing a competitive edge for the developer. Their needs include a range of privacy options from fully enclosed offices which support individual creative work to open spaces for collaborative team work. At the same time, their products must be able to accommodate diverse organizations, unique layout designs, and dynamic work processes.

Further compounding the challenge are the overall objectives to promote productivity, minimize the expenses of absenteeism and workman's compensation, and reduce potential liability. Meeting these objectives often requires improved lighting, better air quality, life safety, and ergonomic task support.

As previously mentioned, the cost efficient use of building floor space is also an evergrowing concern, particularly as building costs continue to escalate. Open office plans that reduce overall office costs are commonplace, and generally incorporate large, open floor spaces. These spaces are often equipped with modular furniture systems that are readily reconfigurable to accommodate the ever-changing needs of specific users, as well as the divergent requirements of different tenants. However, for privacy, productivity, or other reasons, interior walls and/or partitions are still required although the functionality requirements of interior walls is changing.

Historically, office walls or partitions are made by erecting a wood frame comprising vertical studs spaced on a regular interval, lining each side with gypsum board (sheet rock) panels, then finishing the wall surfaces with a variety of textures and paint. When additional thermal and/or acoustic insulation is needed, insulation medium such as fiberglass, rock wool or mineral wool will commonly be placed to fill the interior space between vertical studs and gypsum board panels.

These conventional walls have proven sturdy, provide adequate privacy and sound proofing, and provide a surface that easily accepts wall hangings such as pictures, paintings, plaques and the like. Furthermore, as is commonly known, conventional walls can easily be repainted, retextured, and can be readily patched and repaired when damaged. Conventional gypsum board partitions are typically custom built floor-to-ceiling installations that, due primarily to the vertical studs, are time-consuming to erect and build. The increased need for utility wiring, such as power and communication cables, have made conventional vertical stud-based walls more cumbersome and inconvenient as horizontal paths for the utility wiring must be routed either through numerous vertical studs or up and into a ceiling passage or plenum, then back down and to the end location.

As previously stated, interior walls in offices, hotels and the like are typically made by erecting a frame that includes vertical studs, either wood or steel, on a 12" or 16" spacing, lining each side with gypsum board (sheet rock) panels, then finishing the wall surfaces with a variety of textures and paint. FIGS. 1a–1d illustrate a cross-sectional top-down view of such a constructions.

FIG. 1a shows prior art wall construction (100) comprised of vertical 2×4 studs (102) lined on each side by ⅝" gypsum board (101). FIG. 1b shows prior art wall construction (200) comprised of vertical 2×4 studs (202) lined on each side by ⅝" gypsum board (201) with insulation (203) filling the interior space.

FIG. 1c shows prior art wall construction (300) comprised of 3½' vertical steel studs (302) lined on each side by ⅝" gypsum board (301). FIG. 1d shows prior art wall construction (400) comprised of 3½" vertical steel studs (402) lined on each side by ⅝" gypsum board (401) with insulation (403) filling the interior space.

For the primary objective of increasing the sound attenuating properties of walls, numerous alternative practices have been used FIGS. 1e–1g provide top-down cross-sectional views of alternative constructions.

FIG. 1(e) shows a prior art wall construction (500) wherein vertical 2×4 studs (502) are placed in a staggered configuration such that no direct rigid connection is made between gypsum board panels (501) lining each wall face. Insulation (503) is used to fill interior spaces.

FIG. 1(f) shows a prior art wall construction wherein vertical 2×4 studs (602) are placed in a two-wide configuration effectively doubling the overall wall thickness. Gypsum board (601) lines each face and insulation (603) fills interior spaces.

FIG. 1g is similar to FIG. 1f except the two-wide 2×4 studs are replaced by 7" steel studs (702) and two layers of gypsum board (701) are used on one side. Insulation (703) is used to fill interior spaces. The wall construction of FIG. 1g, by way of the double layer of gypsum board on one face provides a one hour fire rating as required by many commercial applications such as hotel constructions.

What is needed in the art is a wall construction method that effectively utilize the favorable structural and acoustic properties of superior construction materials, namely compressed straw panels, discussed infra. Further, what is needed in the art is a wall construction method that is quicker and more cost effective to install than conventional wall constructions while providing easy routing and re-routing of increasing amounts of utility wiring and communication cables. Still further, what is needed in the art is a wall construction method that provides the flexibility and reconfigurability of currently available partial or full height partition systems while providing the sturdiness, sound attenuation and ease of resurfacing provided by conventional gypsum board walls. Finally, what is needed in the art is a wall construction that contains no exterior connectors Though most of the background discussion, supra, implies in interior application for the improved wall and partition construction disclosed herein, said construction is well suited for exterior wall constructions as well. In exterior applications, the hollow interior space may be used to contain supplemental thermal and/or acoustic insulation. Further, said compressed straw panels are well suited for accepting a variety of weather proof panels, coatings, or the like attached thereto.

SUMMARY OF THE INVENTION

The present invention relates to the finishing or fitting-out of interior building space such as offices, hotels, conference centers, business centers, meeting rooms, 6 medical facilities, classrooms, etc. Particularly, the present invention provides for the finishing out of open interior space using a system comprising substantially vertically oriented interior connecting members generally spaced approximately 4 ft. apart with compressed straw panels assembled thereon in a systematic manner resulting a wall or partition that includes no exterior penetrations or connectors. The result is a relatively seamless exterior surface that can be finished in a plurality of ways, but one that, if desired, can be utilized with minimal surface treatment. Further, the finished wall is structurally strong, but substantially hollow, thus enabling very easy routing and re-routing of utility wiring therethrough. The vertical interior connecting members are provided with a plurality of horizontal opening through which utility wiring and communication cabling can easily be routed. Assembly is simple and fast relative to the construction of conventional interior walls, thus by virtue of significant savings in labor costs, is cost effective relative to conventional wall constructions. The features and advantages of subject invention will be further understood and appreciated by those skilled in the art by reference to the following written specification, claims, and appended drawings.

BRIEF DESCRIPTION OF THE DRAWINGS

The figures presented herein when taken in conjunction with the written disclosure form a complete description of the invention.

DETAILED DESCRIPTION OF THE INVENTION

The present invention utilizes solid core compressed straw panels comprised of a matrix of highly compressed straw, usually wheat, rice, oat or other recovered agricultural straw, lined on all sides by paper or paperboard. Typically, the panels are made through a dry extrusion process wherein straw is compressed into a substantially flat continuous web, normally between 1½" and 3½" thick and between 40" and 60" wide. The continuous web is then cut into rectangular panels of various lengths. Panel length is easily varied. The compressed straw is arranged in layers with the straw fibers substantially parallel in orientation extending transversely across the panel from side to side when the panel is in a normal in-use orientation. Said panels are typically rectangular in shape, and for the purposes of this disclosure, will be oriented such that the longer edges are substantially vertical and the shorter edges are substantially horizontal. In this orientation, said straw fibers will assume a generally horizontal orientation. Said panels have a tackable surface, i.e., are suitable for securely accepting nails, tacks, screws and other connecting means for attaching and/or hanging items from the panel surfaces. Further, surfaces of the panels are suitable for accepting surface texture, paint, wall paper, and other conventional wall coverings. Panels can be factory finished with surface texture, paint, wall paper and the like, or said surface treatments can easily be applied to a finished wall. Compressed straw panels are typically much thicker and stronger than gypsum board and possess higher nail pull values, thus providing nails, screws, or the like driven therein to support more weight than if driven into gypsum board. Additionally, said panels possess sound insulating properties superior to both conventional gypsum board walls and many currently available commercial interior partition systems. Solid core panels further provide fire resistant properties superior to materials used in many presently available interior wall construction and partition systems. To enhance flexibility, these panels can be cut and formed in the field using conventional tools such as circular, saber or band saws, routers, planers, sanders and the like. Ideally, however, the wall will be designed so that field alteration of said panels is minimized, thus minimizing installation time and costs. In the preferred embodiment, panels manufactured by Affordable Building Systems of Texas are used.

Figure 5A:
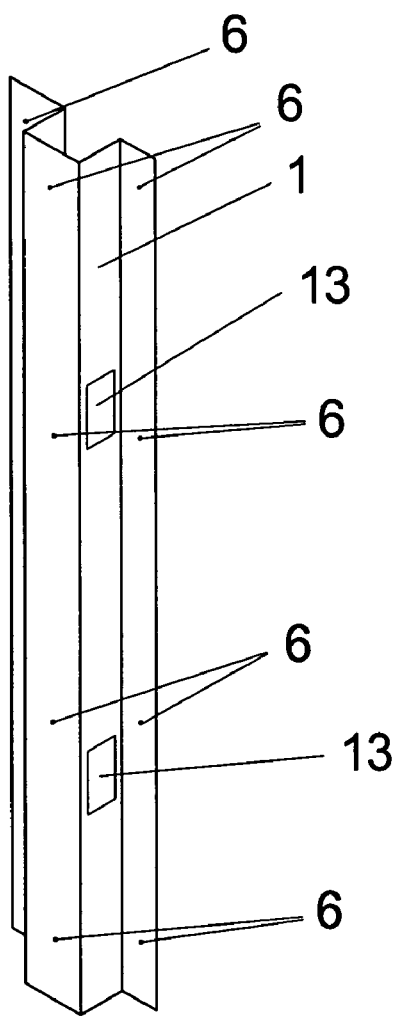
FIG. 5a shows an isometric view of hat channel (1).
Figure 5B:
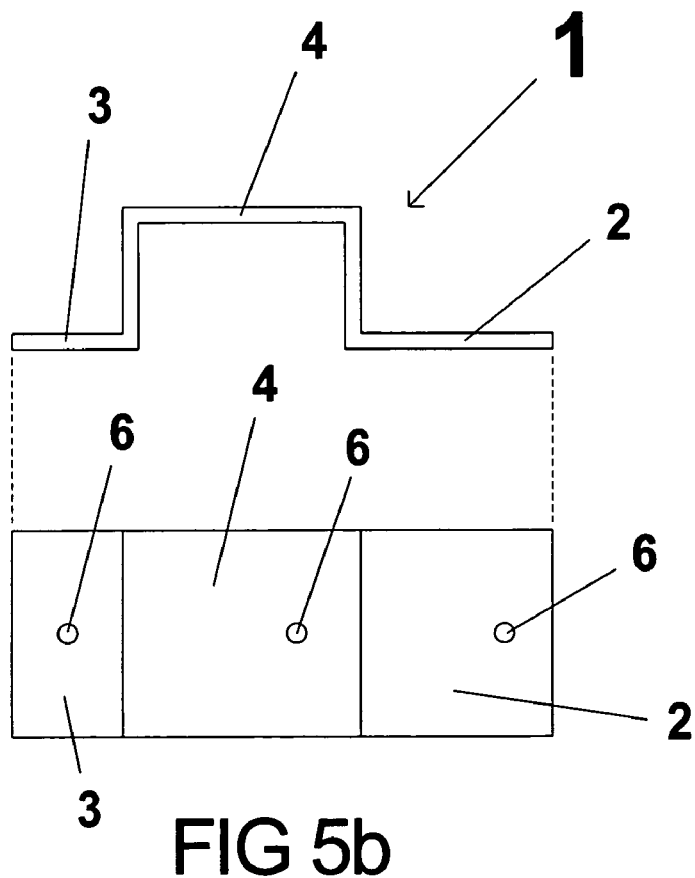
FIG. 5b shows a cutaway detail top and side view of hat channel (1).

Referring FIGS. 5a and 5b, vertical hat channel (1) is shown. FIG. 5b shows a cross sectional detail of hat channel (1) having a substantially "hat" shaped cross section comprised of a large flange (2), a small flange (3), and a spine channel (4) located therebetween. Spine channel (4), large flange (2) and small flange (3) each have a substantially flat outer surface and all are in substantially parallel relation. In the preferred embodiment, hat channel (1) is made of 0.012–0.016 gauge steel. Aluminum or other rigid material of comparable strength and stiffness may be substituted. Material weight can be adjusted based upon the structural requirements of the particular application. As illustrated in FIG. 5a, each hat channel (1) is provided with a plurality of horizontal utility openings (13). It should be noted that utility openings (13) can be provided as needed and can be cut in the field using boring drills, saber or cutoff saws or other suitable tools. Each utility opening (13) is shown as rectangular, but can be circular, square, triangular or any other shape that provides sufficient area to receive utility wiring therethrough. Each hat channel (1) is also shown to include a plurality of lag screw receivers (6) each for receiving a lag screw or other attachment means therethrough. Lag screw receiver (6) is a simple hole through the hat channel material sized to provide an opening through which a lag screw (7) may be inserted. Throughout this disclosure, lag screws are used for illustration and are the connector of choice, but nails or other suitable penetrating connectors may be used.

Lag screws provide for easy disassembly of a wall with minimal damage to panels. Further, it should be noted that throughout the disclosure, hat channel (1) is shown as having a large flange (2) and a small flange (3). This size differentiation is done largely to provide for descriptive purposes, and said flanges can be the same size.

Figure 1A:
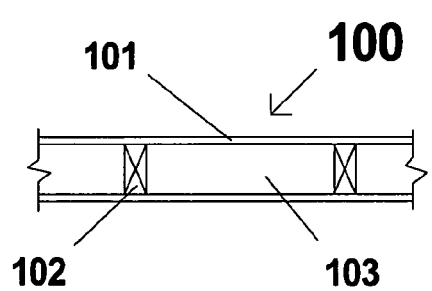
FIGS. 1a through 1h illustrate known methods of constructing walls from panels and support members.
Figure 1B:
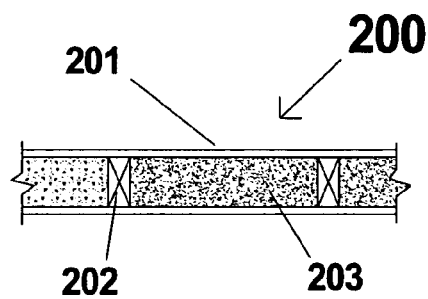
Figure 1C:
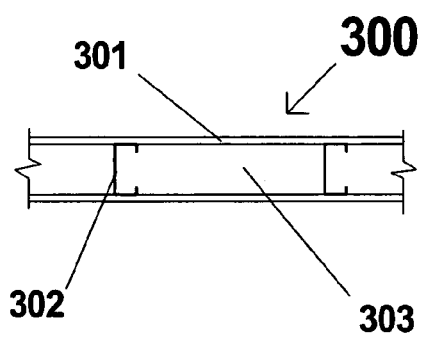
Figure 1D:
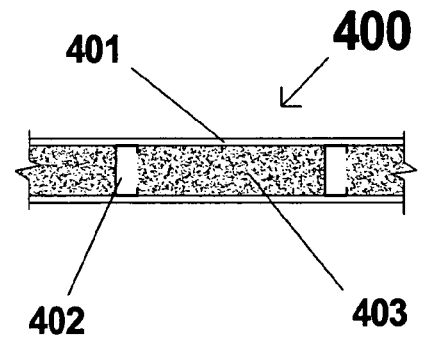
Figure 1E:
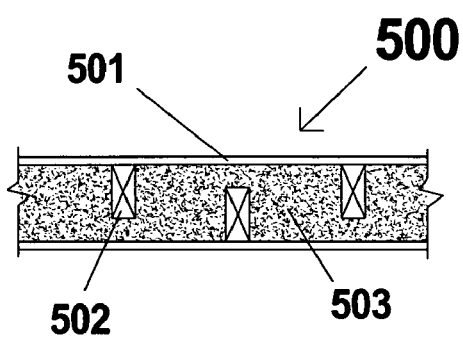
Figure 1F:
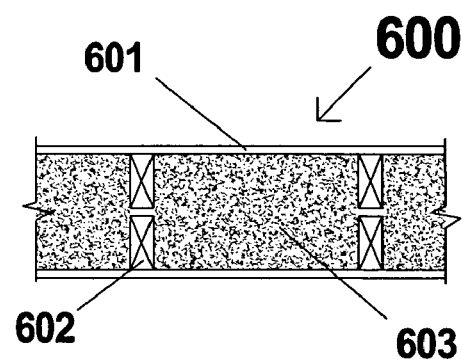
Figure 1G:
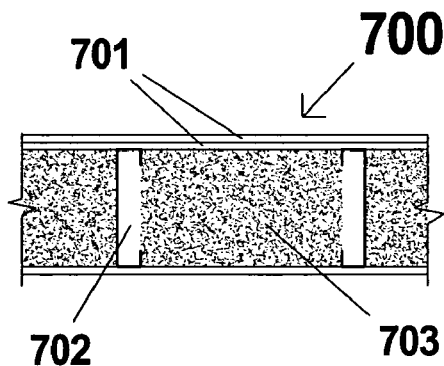
Figure 1H:
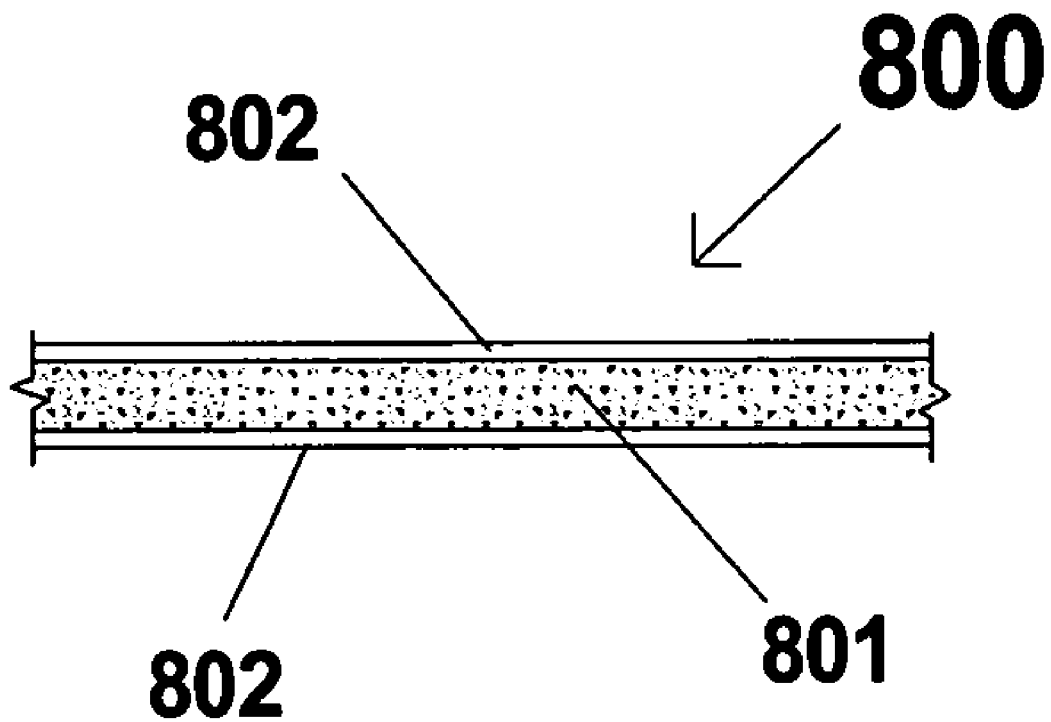
Figure 2A:
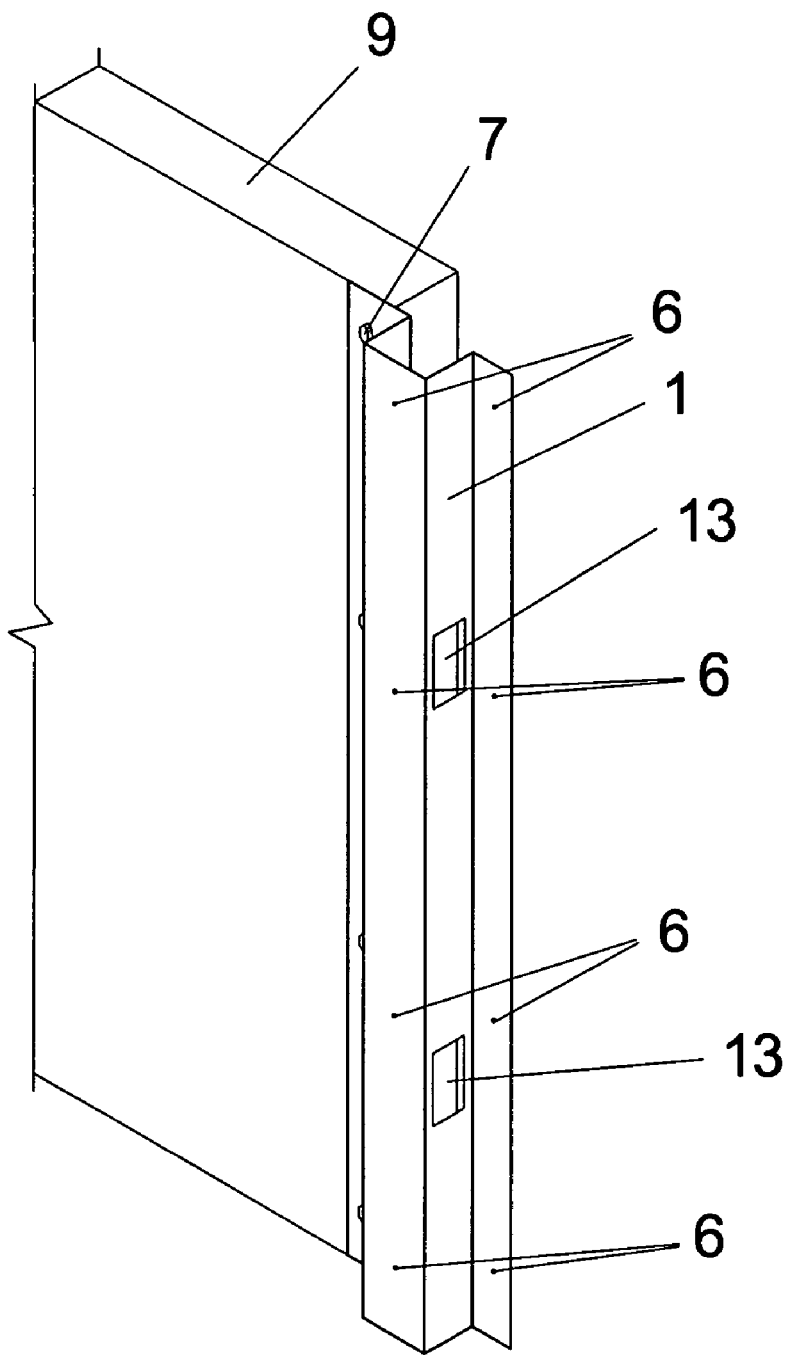
FIG. 2a shows an isometric view of a hat channel and first straw panel connection.
Figure 6:
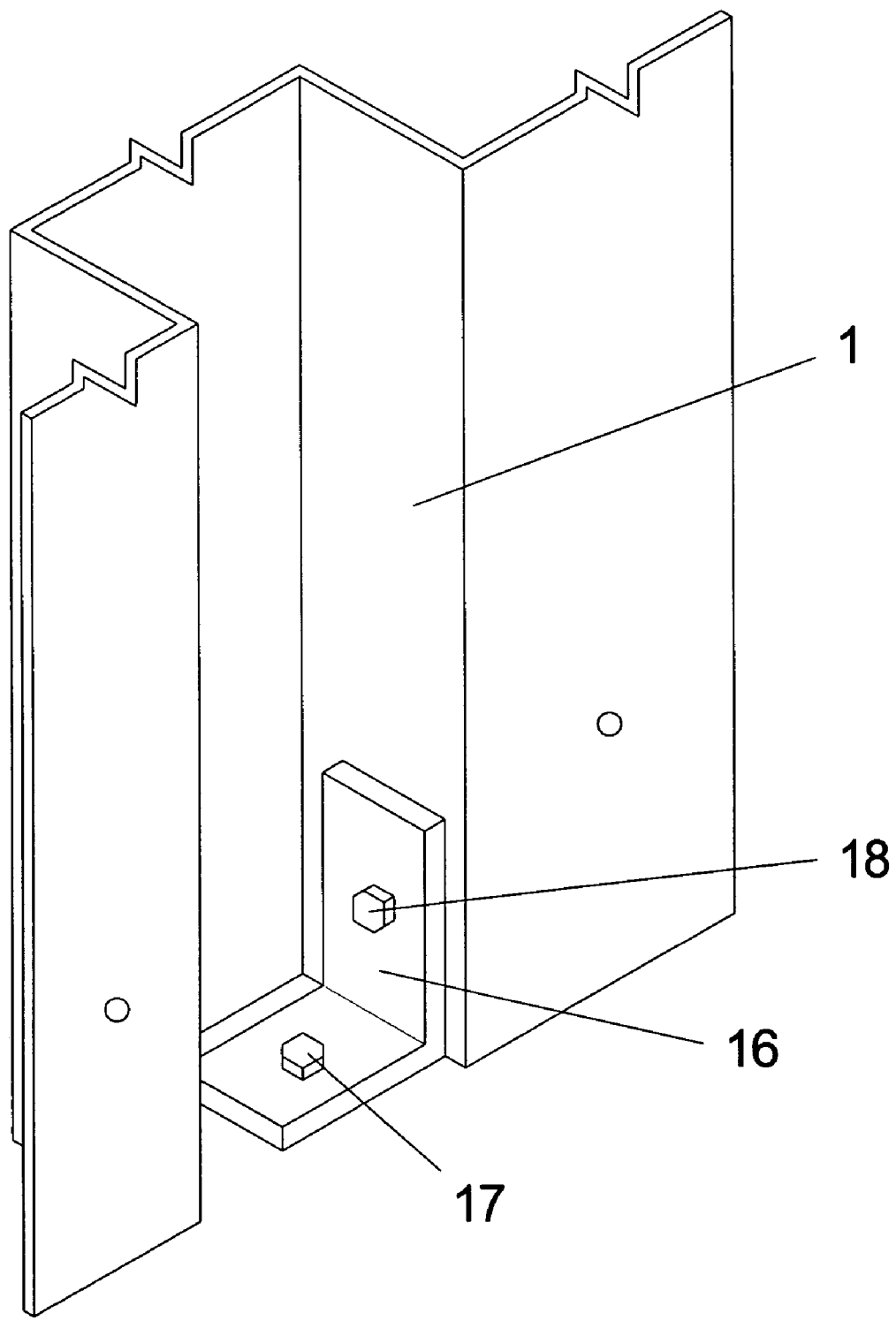
FIG. 6 shows an isometric detail view of a connection between hat channel (1) and a floor and/or ceiling.

Referring to FIG. 2a, a vertically positioned hat channel (1) is shown. Each hat channel (1) is designed to span from floor to ceiling and can be fixed in place by any of a number of conventional means. FIG. 6 shows an 'L' bracket (16) anchored to the floor by means of anchor bolt (17) and bolted to hat channel (1) by means of machine bolt (18). Referring back to FIG. 2a, hat channel (1) is shown in proper vertical position with a first straw panel (9) attached thereto. A lag screw (7) is positioned through each lag screw receiver (6) located on large flange (2) and fixably attached to first straw panel (9). In the preferred embodiment, 1½" lag screws are used. It is recommended that lag screws be located at least 1½" from the panel edge. Step one of the preferred method comprises placing first straw panel (9) adjacent to a hat channel (1) such that a portion of large flange (2) remains exposed, then attaching said large flange (2) to said first straw panel (9) by means of a plurality of lag screws (7) as illustrated in FIG. 2a.

Figure 2B:
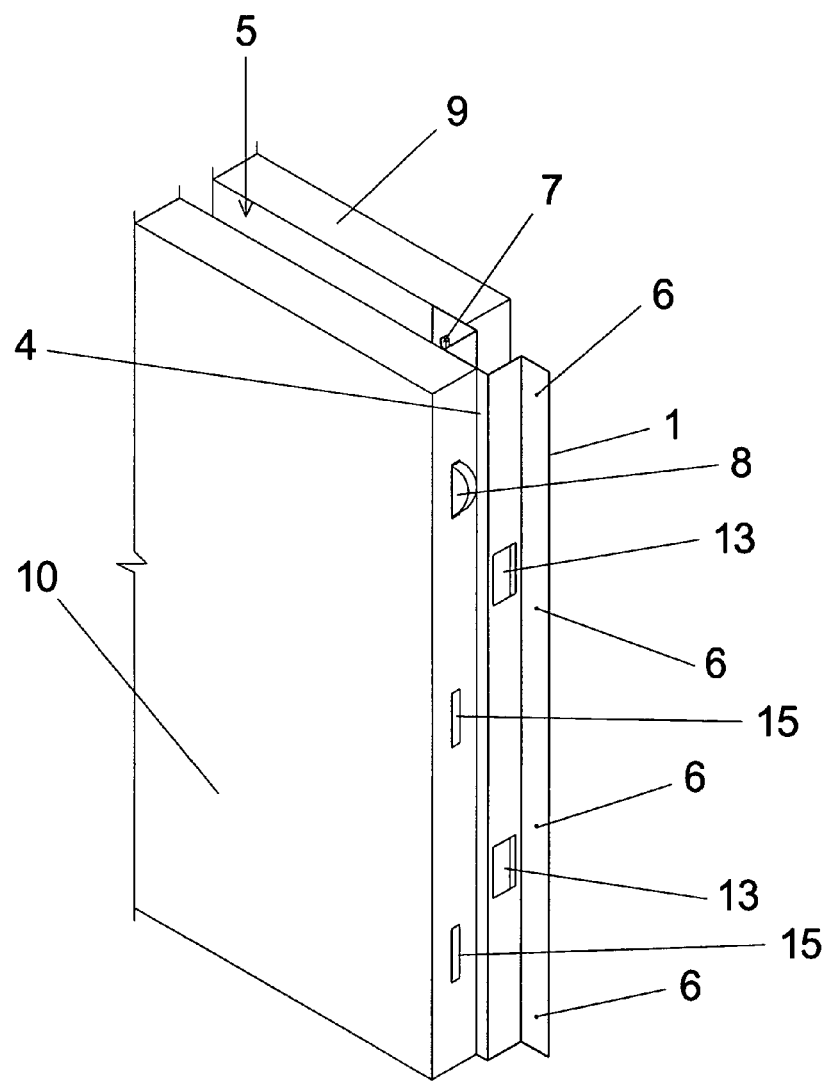
FIG. 2b shows an isometric view of a hat channel with first and second straw panels attached.

FIG. 2b shows a second straw panel (10) positioned in substantially parallel position to first straw panel (9). Second straw panel (10) is positioned adjacent to spine channel (4) such that a portion of the outer flat surface of spine channel (4) remains exposed. Second straw panel (10) is provided with a plurality of disc recesses (15) located along the edge nearest spine channel (4) as illustrated. Each disc recess (15) is for receiving a connector disc (8) therein. Disc connector (8) and disc recess (15) are disclosed in related U.S. Pat. No. 6,634,077 and published U.S. patent application Ser. No. 10/387,994. FIG. 2b shows a disc connector (8) inserted into the top disc recess (15). A lag screw (7) is positioned through each lag screw receiver (6) located on spine channel (4) and fixably attached to second straw panel (10) to provide a substantially rigid connection between spine channel (4) and second straw panel (10). In the preferred embodiment, 1½" lag screws are used. It is recommended that lag screws be located at least 1½" from the panel edge. Step two of the preferred method comprises placing second straw panel (10) adjacent to spine channel (4) and in substantially parallel relation to first straw panel (9) such that a portion of the outer surface of spine channel (4) remains exposed, attaching said spine channel (4) to said second straw panel (10) by means of a plurality of lag screws (7) positioned through lag screw receivers (6) located through spine channel (4), and fully inserting a disc connector (8) into each disc recess (15).

Figure 2C:
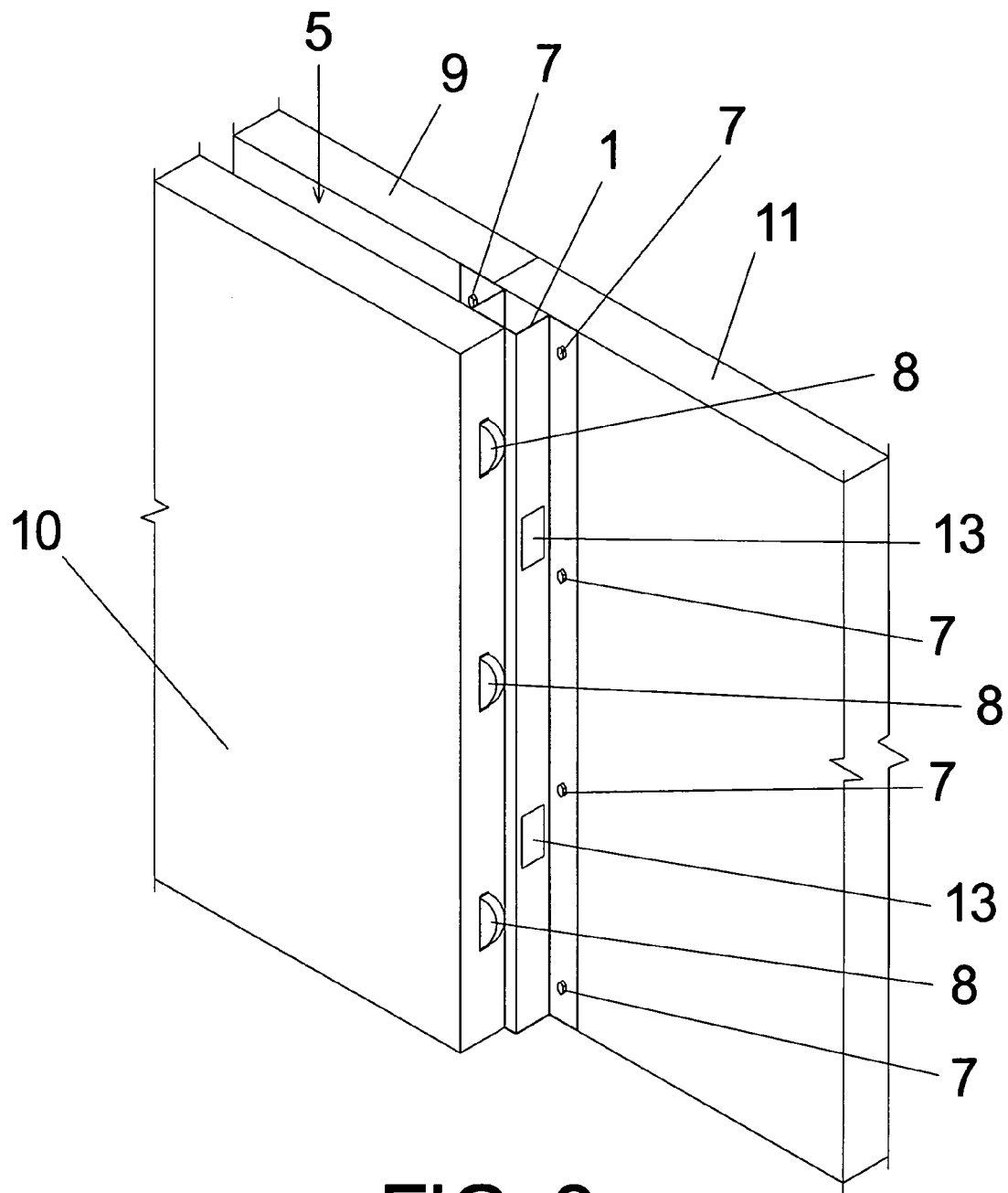
FIG. 2c shows an isometric view of a hat channel with first, second and third panels attached.

FIG. 2c shows a third straw panel (11) positioned in substantially parallel position to first straw panel (9) and second straw panel (10). Third straw panel (11) is positioned adjacent to small flange (3) and in abutted relation to first straw panel (9). A lag screw (7) is positioned through each lag screw receiver (6) located on small flange (3) and fixably attached to third straw panel (11) to provide a substantially rigid connection between small flange (3) and third straw panel (11). As indicated supra, the preferred embodiment utilizes 1½" lag screws. It is recommended that lag screws be located at least 1½" from the panel edge. Step three of the preferred method comprises placing third straw panel (11) adjacent to small flange (3) and in abutted and substantially parallel relation to first straw panel (9), then attaching said small flange (3) to said third straw panel (11) by means of a plurality of lag screws (7) positioned through lag screw receivers (6) located through small flange (3).

Figure 2D:
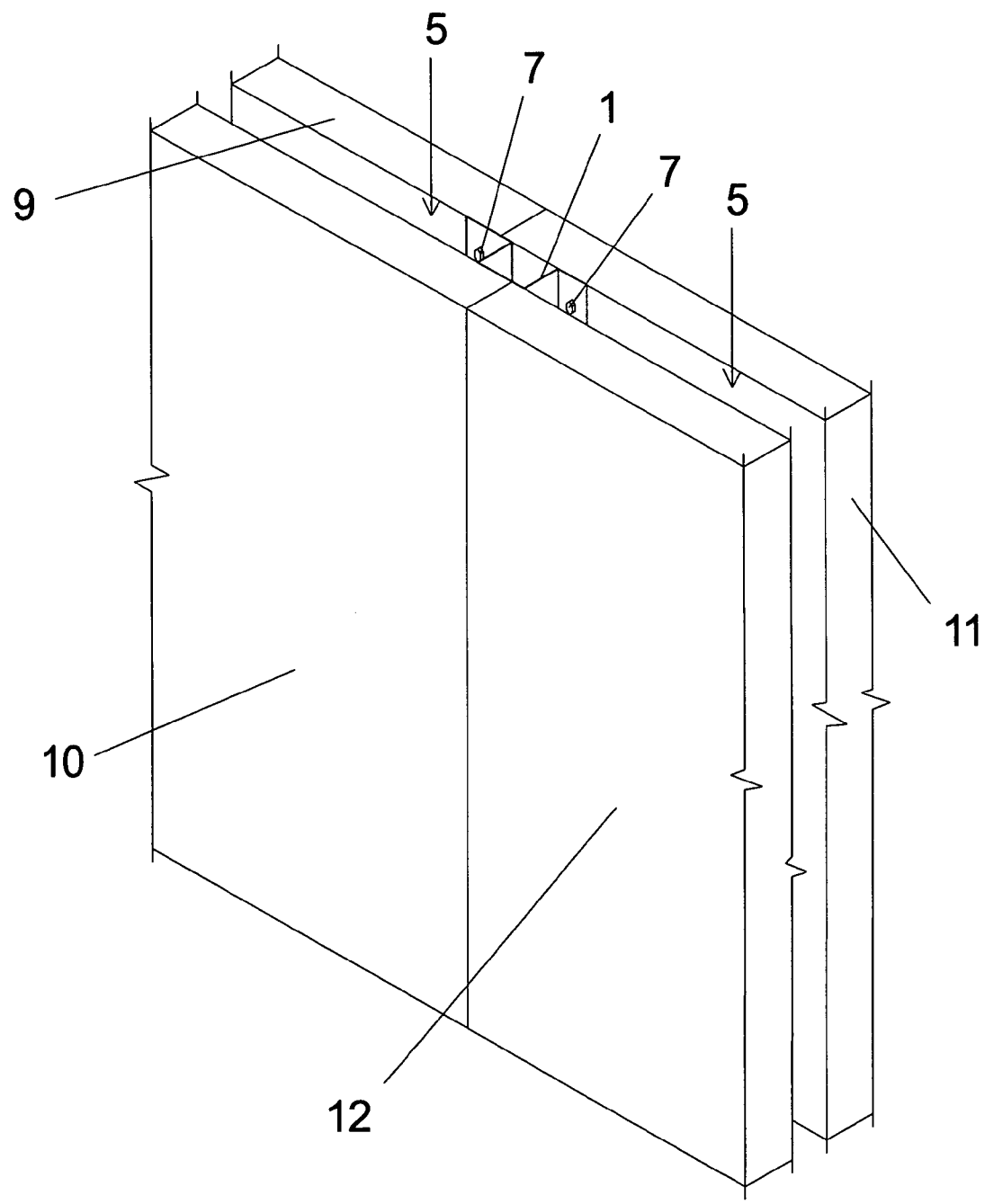
FIG. 2d shows an isometric view of a hat channel with first, second, third and fourth straw panels attached.

FIG. 2d shows a fourth straw panel (12) positioned in substantially parallel and abutted relation to second straw panel (10). Fourth straw panel (12) is positioned adjacent to the remaining exposed outer surface of spine channel (4) and in full edge to edge abutted position relative to second straw panel (10). Fourth straw panel (12) is provided with a plurality of disc recesses (15) positioned to correspond to each disc recesses located on the abutted edge of second straw panel (10) and to fully receive therein each disc connector (8) protruding from the edge of second straw panel (10). Connection between second straw panel (10) and fourth straw panel (12) is provided by a friction fit between each disc recess (15) and respective disc connector (8) inserted therein. Step four of the preferred method comprises aligning fourth straw panel (12) into adjacent planar position relative to second straw panel (10) and moving fourth straw panel into abutted relation to second straw panel (10) thereby causing disc connectors (8) protruding from the abutted edge of second straw panel (10) to insert fully into disc recesses (15) located on the abutted edge of fourth straw panel.

In an alternative embodiment, each disc connector (8) can be further attached within each disc recess (15) by means of an adhesive placed therein. In said alternative embodiment, polyvinyl acetate-based adhesives are recommended.

Figure 3A:
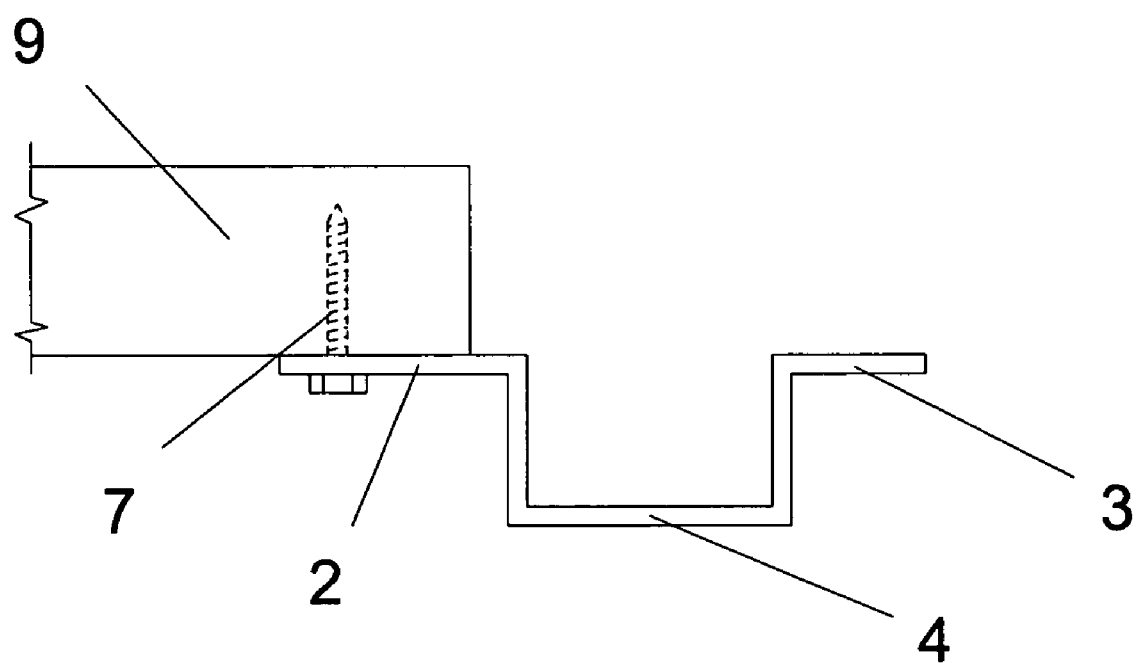
FIG. 3a shows a top-down cutaway view of the attachment between first panel is (9) and hat channel (1).

Referring now to FIG. 3a which shows a top-down cross sectional view of first straw panel (9) positioned adjacent to large flange (2) with lag screw (7) inserted through lag screw receiver (6) and attached to first straw panel (9). As illustrated a portion (>15%) of the surface of large flange (2) remains uncovered.

Figure 3B:
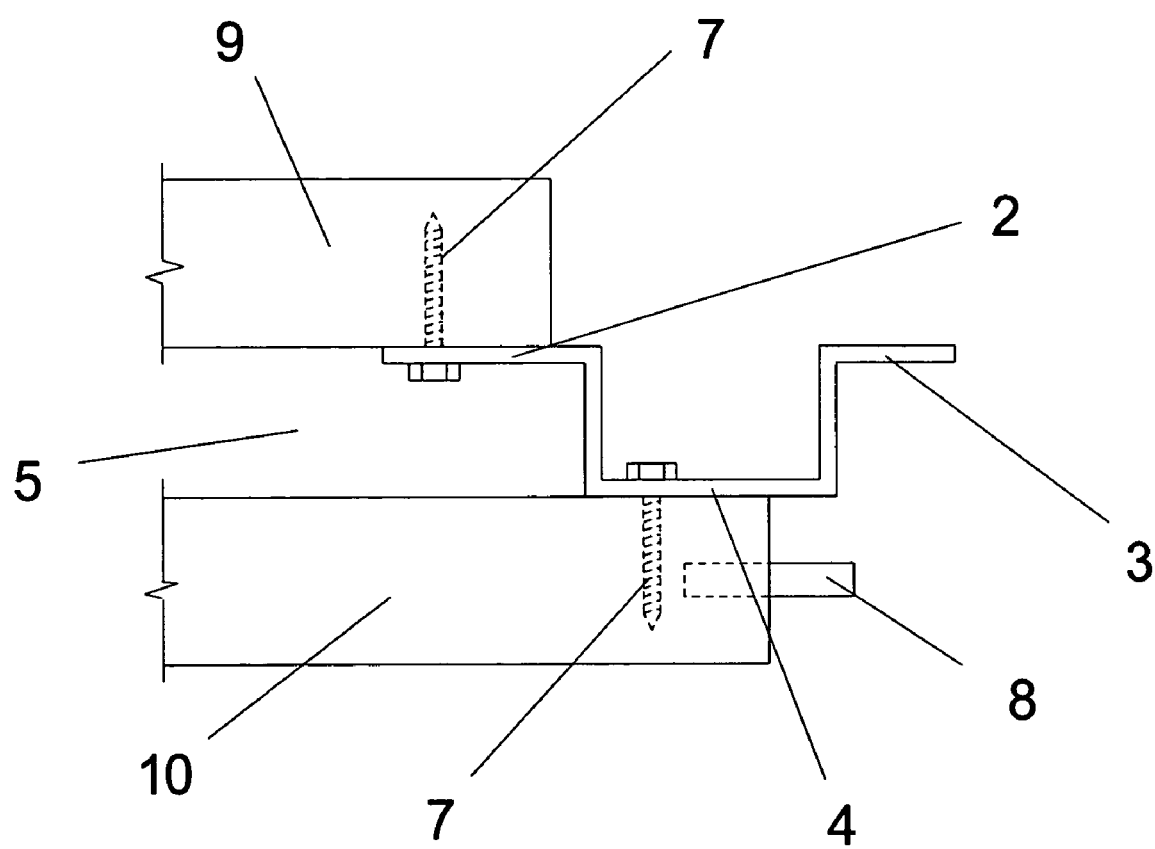
FIG. 3b shows a top-down cutaway view of first (9) and second (10) panels attached to a hat channel (1).

FIG. 3b shows a top-down cross sectional view of first straw panel (9) positioned adjacent to large flange (2) with lag screw (7) inserted through lag screw receiver (6) and attached to first straw panel (9). Second straw panel (10) is shown positioned adjacent to spine channel (4) with lag screw (7) inserted through lag screw receiver (6) and attached to second straw panel (10). A portion of the outside surface of spine channel (4) remains uncovered. Disc connector (8) is shown fully inserted into disc recess (15).

Figure 3C:
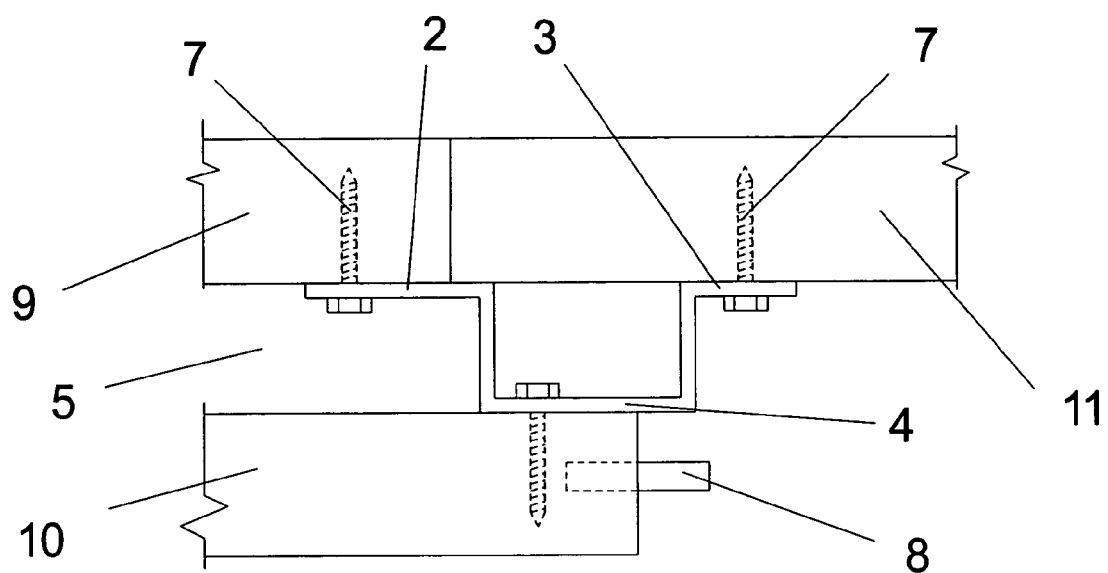
FIG. 3c shows a top-down cutaway view of first (9), second (10) and third (11) panels attached to a hat channel (1).

Continuing on to FIG. 3c which shows the addition of third straw panel (11) positioned adjacent to small flange (3), covering the remaining exposed surface of large flange (2) and in abutted relation to first straw panel (9). Lag screw (7) is inserted through lag screw receiver (6) and attached to third straw panel (11).

Figure 3D:
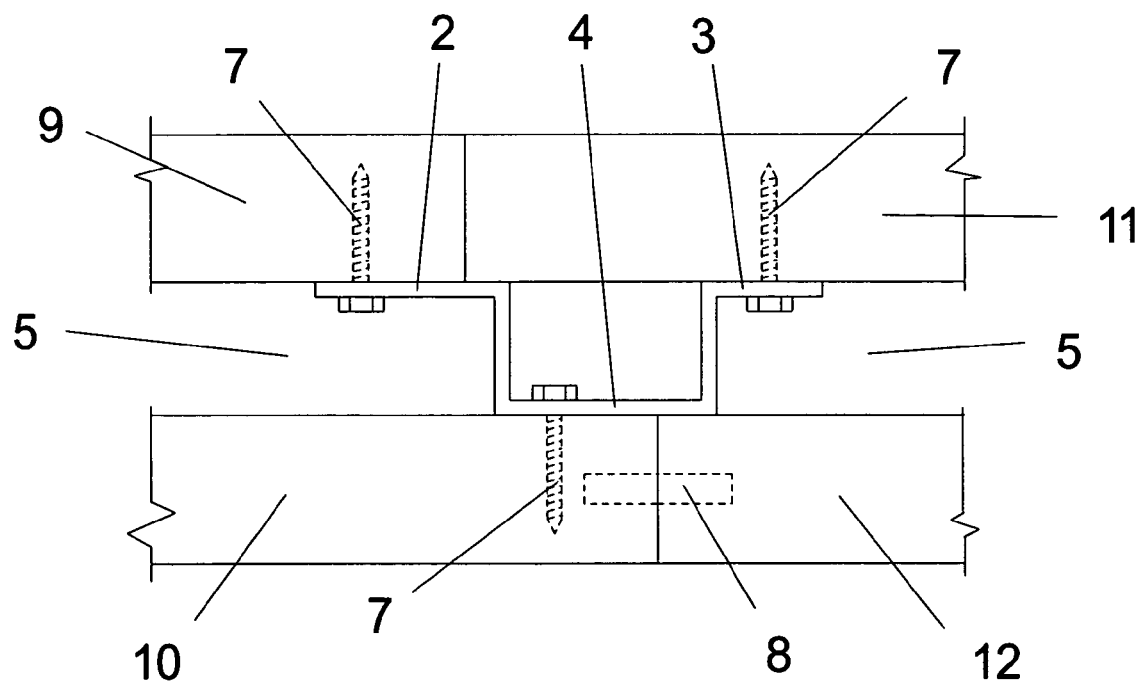
FIG. 3d shows a top-down cutaway view of first (9), second (10), third (11) and fourth (12) panels attached to a hat channel (1).

Next, FIG. 3d shows the addition of fourth straw panel (12) positioned to cover the remaining outer surface of spine channel (4) and in abutted relation to second straw panel (10). As previously discussed, fourth straw panel (12) is provided with a plurality of disc recesses (15) that correspond to those on second straw panel (10) such that when fourth straw panel (12) is properly positioned, disc connectors (8) protruding from second straw panel (10) are received into disc recesses (15) located on fourth straw panel (12).

Figure 3E:
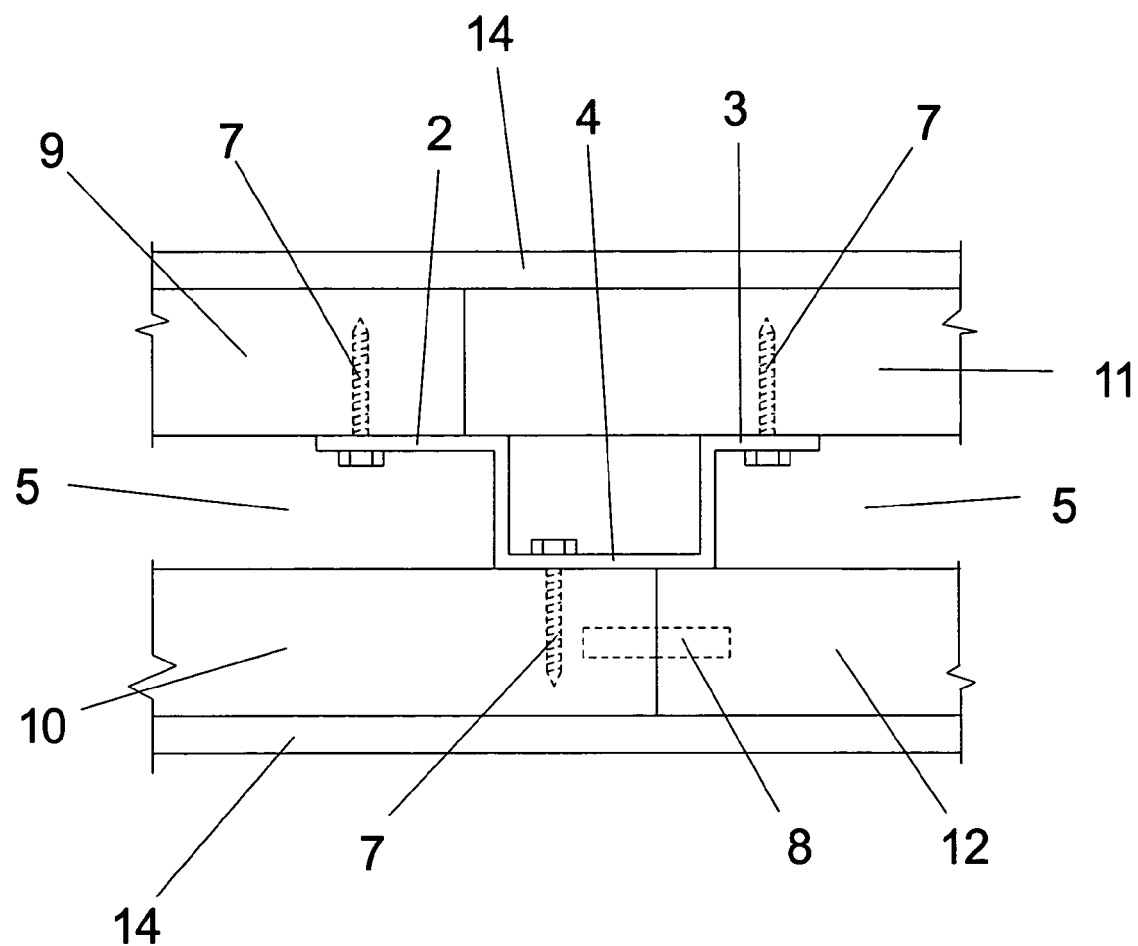
FIG. 3e shows a top-down cutaway view of the optional addition of a decorative panel (14) attached to the finished wall face.

FIG. 3e shows an optional fifth step wherein gypsum board sheets (14) are used to cover the outer surface of the finished wall. Hard board sheets, wood or composite paneling, or any number of largely decorative sheetings can be used to cover the wall surfaces if so desired.

Figure 4:
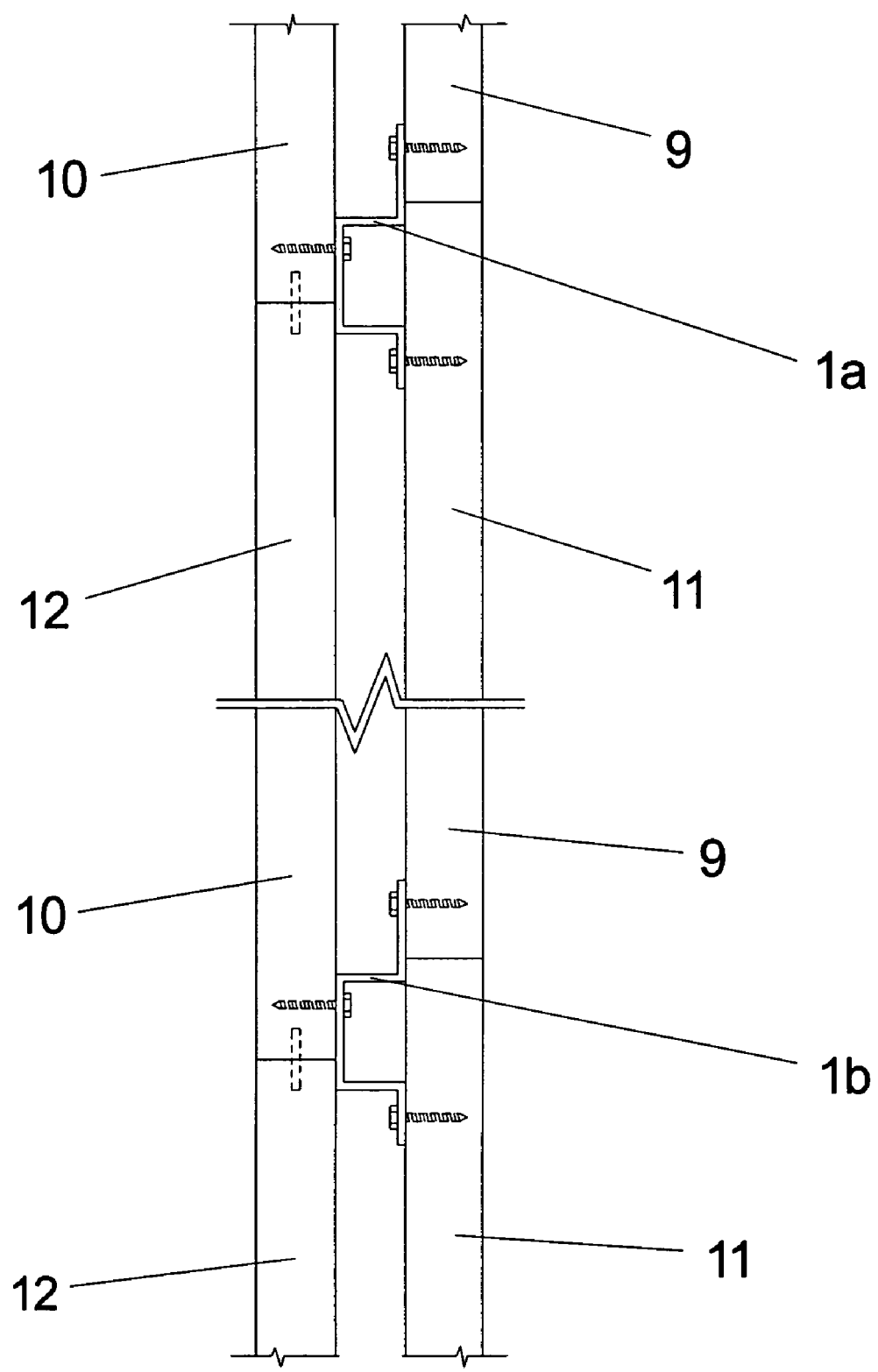
FIG. 4 shows a top-down cutaway view of a finished wall construction.

FIG. 4 provides a top-down cutaway view of a composite section of a finished wall. First (top) hat channel is identified as (1a) and second (bottom) hat channel identified as (1b). For illustration, the wall assembly shown will be constructed from the top of the page downward, thus hat channel (1a) will be put in place before hat channel (1b). It can be seen from FIG. 4 that, as a wall is constructed according to the method disclosed herein, third straw panel (11) and fourth straw panel (12) relative to first hat channel (1a) become the first (9) and second (10) straw panels relative to second hat channel (1b). Step one at the second hat channel (1b) must be carried out prior to step four at the first hat channel (1a). Accordingly, step two at the second hat channel (1b) will immediately follow step four at the first channel (1a). This sequence is followed for the length of the wall.

Figure 7:
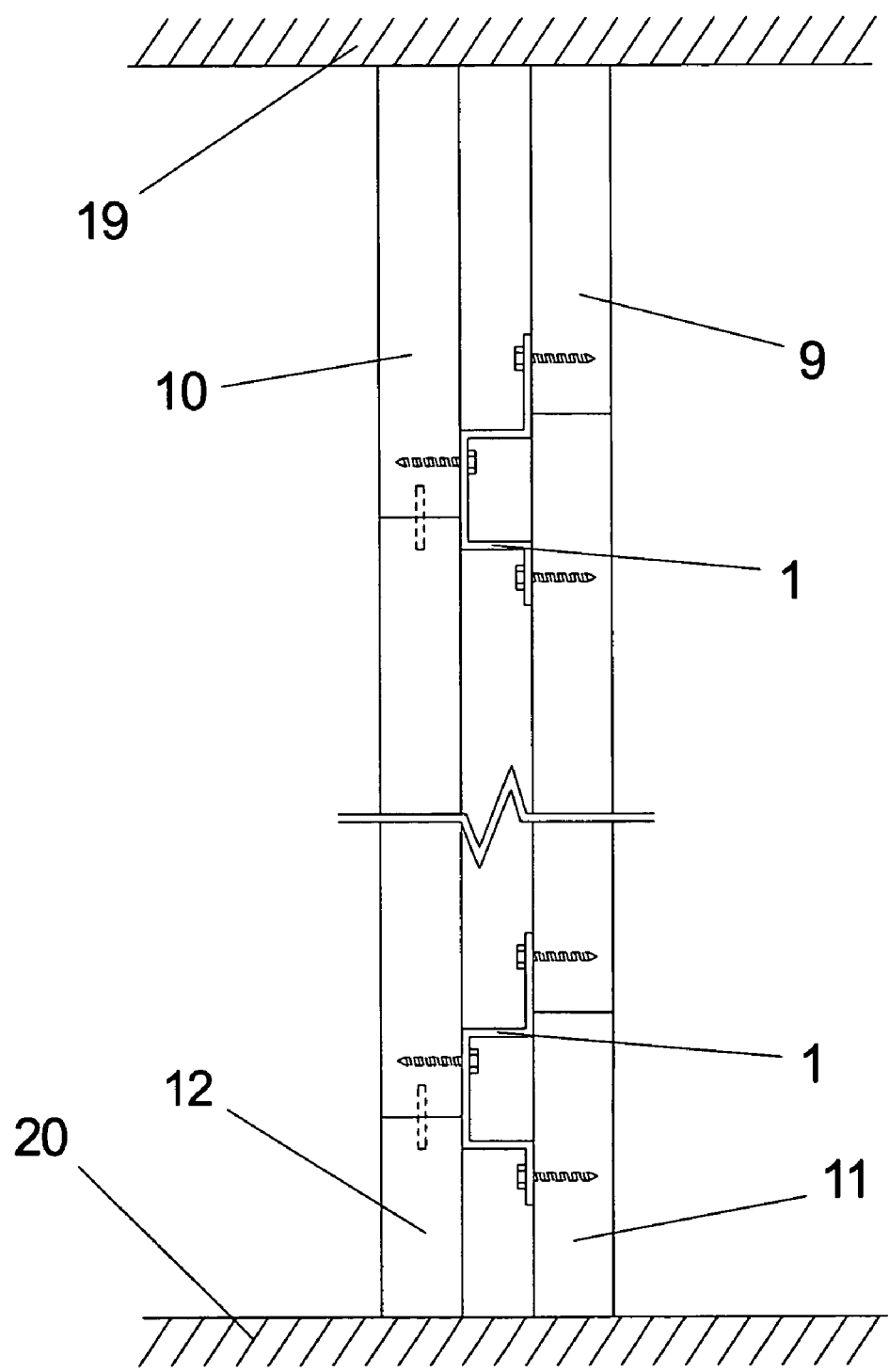
FIG. 7 shows a preferred termination of the beginning and ending of a wall construction.

Though wall terminations fall outside the scope of this disclosure, a top-down cutaway illustration of a preferred method is disclosed in FIG. 7. First end wall (19) and second end wall (20) are shown in perpendicular position relative to subject wall construction. The preferred method of beginning said wall construction is to position first hat channel (1a) in close proximity to first end wall (19), preferably within approximately 1 ft. First straw panel (9) and second straw panel (10) are cut to the proper length as illustrated and attached to hat channel (1a) as described supra. Accordingly, this preferred method of terminating subject wall construction is to position last hat channel (1b) in close proximity to second end wall (20), preferably within approximately 6 inches. Third straw panel (11) is then cut to the proper length as illustrated and attached to hat channel (1b). Finally, fourth straw panel (12) is cut to the proper length then bonded into place by means of adhesive connection between disc connectors (8) and respective disc recesses (15) as described supra.

Figure 8A:
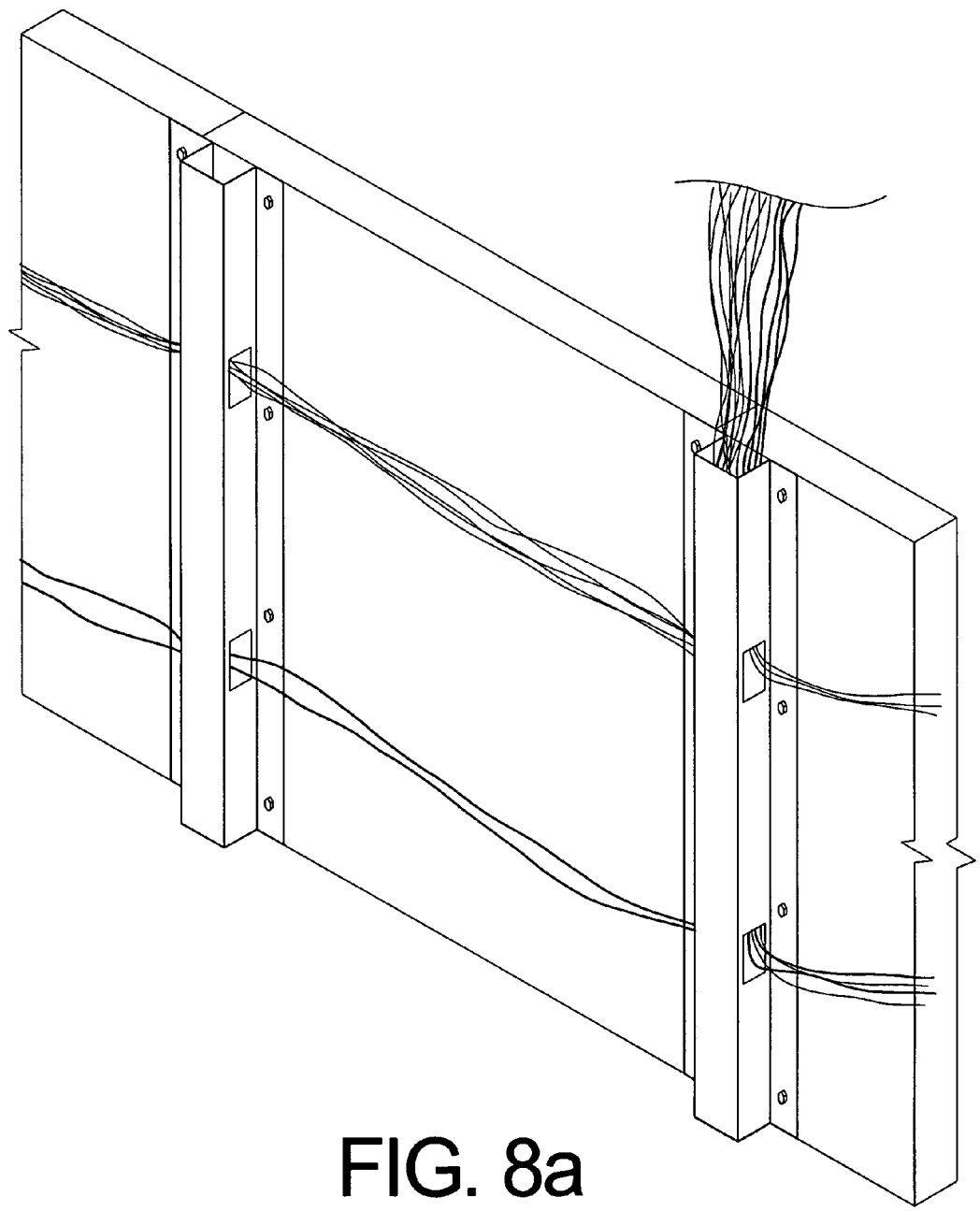
FIG. 8a shows an isometric view of an optional method of utility and/or communication wire routing.
Figure 8B:
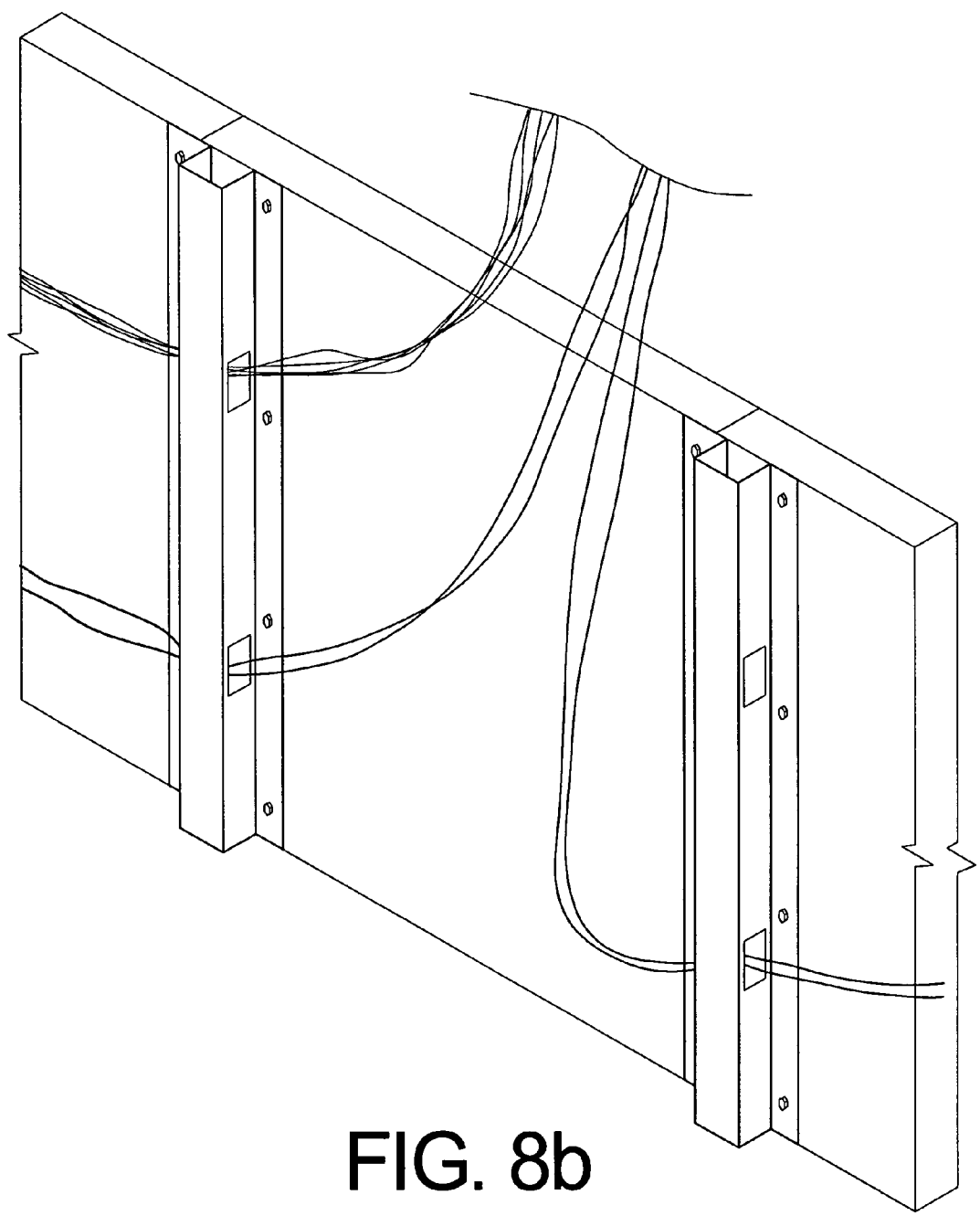
FIG. 8b shows an isometric view of an optional method of utility and/or communication wire routing.
Figure 8C:
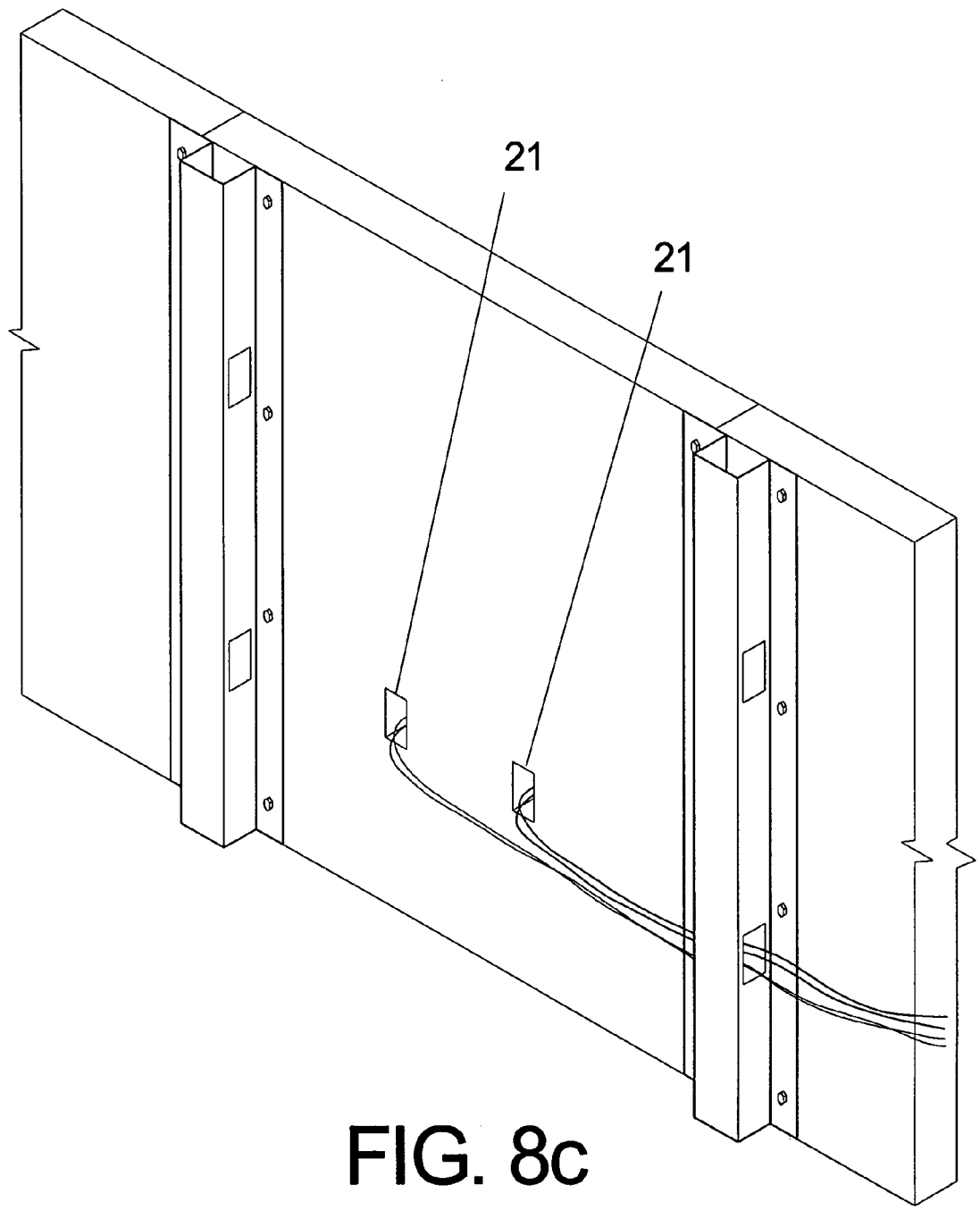
FIG. 8c shows an isometric view of communication and/or utility wiring routed through a wall opening (21).

Subject wall construction provides easy routing of utility and communication wiring as shown in FIGS. 8a–8c each providing an isometric view of the interior of a finished wall absent panels from one side to provide a view of the interior. First, FIG. 8a shows wiring longitudinally routed through the center of a hat channel, then redirected laterally through utility openings. Next, FIG. 8b shows an optional arrangement wherein wiring enters the wall interior without longitudinal routing through a hat channel then passes through utility openings as shown. Finally, FIG. 8c shown wiring routed through wall openings (21) for connection to an electrical receptacle, telephone connector, computer network connector or the like.

The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad meaning of the terms of the attached claims.

The restrictive description and drawings of the specific examples herein do not point out what an infringement of this patent would be, but are to provide at least one explanation of how to use and make the inventions. The limits of the inventions and the bounds of the patent protection are measured by and defined in the following claims.

What is claimed is:

1. An improved wall construction for positioning a plurality of rigid, self-supporting panels to provide exterior walls and/or divide or partition interior building space, said panels having a substantially rectangular shape with an inner and outer face and a top, bottom, front and rear edge, said wall construction comprising:

a plurality of parallel and coplanar orientated hat channel members, said hat channel members each having a substantially hat-shaped cross section that includes a large flange and a small flange joined together by a spine channel located therebetween, said large flange, small flange, and spine channel each having a substantially flat outer surface with said outer surfaces in substantially parallel respective position, said large and small flanges being in planar respective position;

a first panel positioned adjacent to said large flange on a first hat channel member such that inner face of said first panel is in contact with outer surface of said large flange with said front edge of first panel in substantially parallel alignment with said first hat channel member and inner face of said first panel partially covers outer surface of said large flange, said first panel further being connected to said first hat channel by means of a plurality of penetrating connectors positioned through said large flange and terminating within said first panel;

a second panel positioned with inner face adjacent to said outer surface of spine channel on first hat channel member such that said front edge of second panel is in substantially parallel alignment with said first hat channel member and inner face of said second panel covers a portion of the outer surface of said spine channel, said second panel further being connected to said first hat channel by means of a plurality of penetrating connectors positioned through said spine channel and terminating within said second panel, said second panel further having a plurality of symmetric recesses centered along said front edge, said recesses each being furnished with a symmetric connector inserted therein such that one-half of each symmetric connector extends outward from said front edge;

a third panel positioned with inner face adjacent to outer surface of said large flange and said small flange and further being positioned with rear edge in abutted relation to said front edge of said first panel, said third panel further being connected to said first hat channel by means of a plurality of penetrating connectors positioned through said small flange and terminating within said third panel, and;

a fourth panel positioned with inner face adjacent to said outer surface of said spine channel, said fourth panel further having a plurality of symmetric recesses centered along said rear edge, said recesses positioned to receive symmetric connectors located along front edge of said fourth panel is placed in abutted relation to front edge of said second panel.

2. The improved wall construction of claim 1 wherein said penetrating connector is selected from the group of nails, brads, tacks, screws, lag screws, rivets, bolts, lag bolts, machine bolts, carriage bolts, stove bolts, toggle bolts, anchor bolts, staples and rivets.

3. The improved wall construction of claim 1 wherein said symmetric recesses are provided with an adhesive placed therein.

4. The improved wall construction of claim 3 wherein said adhesive is comprised of polymer-based material.

5. The improved wall construction of claim 3 wherein said adhesive contains petroleum distillates.

6. The improved wall construction of claim 1 wherein said hat channel is made from a metal or metal alloy.

7. The improved wall construction of claim 1 wherein said hat channel is made from a thermosetting polymer-based material.

8. The improved wall construction of claim 1 wherein said hat channel is made from a thermoplastic polymer-based material.

9. An improved method for constructing a wall including a plurality of rigid, self-supporting panels to divide or partition interior building space, said panels having a substantially rectangular shape with an inner and outer face and a top, bottom, front and rear edge, said front and rear edges having, along a centerline, a plurality of symmetric recesses for accepting a symmetric connector insert therein, said method comprising the steps of:

placing a first hat channel in a coplanar position to a proposed wall, said hat channel having a substantially hat-shaped cross section that includes a large flange and a small flange joined together by a spine channel located therebetween, large flange, small flange, and spine channel each having a substantially flat outer surface with said outer surfaces in substantially parallel respective position, said first hat channel further positioned so that outer surfaces of large flange, small flange and spine channel are in parallel orientation with respect to the desired centerline of the wall, and securing said first hat channel in place by attachment to floor and ceiling;

placing a first panel adjacent to said first hat channel such that front edge of first panel is in substantially parallel position relative to said first hat channel and inner face of said first panel is in contact with and covers a portion of the outer surface of said large flange;

attaching said first panel to said first hat channel by means of a plurality of penetrating connectors placed through said large flange and terminating in said first panel;

placing a second panel adjacent to said first hat channel such that front edge of second panel is in substantially parallel position relative to said first hat channel and inner face of said second panel is in contact with and covers a portion of the outer surface of said spine channel;

attaching said second panel to said first hat channel by means of a plurality of penetrating connectors placed through said spine channel and terminating in said second panel;

inserting symmetric connectors into each of said recesses located along front edge of said second panel such that substantially 50% of each connector protrudes beyond said front edge of said second panel;

placing a second hat channel in substantially parallel orientation to said first hat channel, said second hat channel also having a substantially hat-shaped cross section that includes a large flange and a small flange joined together by a spine channel located therebetween, large flange, small flange, and spine channel each having a substantially flat outer surface with said outer surfaces in substantially parallel respective position, said second hat channel further positioned at a lateral distance from first hat channel equal to the width of one straw panel and oriented so that outer surfaces of large flange, small flange and spine channel are in parallel orientation with respect to the desired centerline of the wall, and securing said second hat channel in place by attachment to floor and ceiling;

placing a third panel adjacent to said first and second hat channels such that inner face of third panel is in contact with remaining exposed outer surface of said small flange on said first hat channel, rear edge of said third panel is in abutted contact with front edge of said first panel, and inner face of said third panel is in contact with and covers a portion of the outer surface of said large flange on said second hat channel;

attaching said third panel to said first hat channel by means of a plurality of penetrating connectors placed through said small flange and terminating in said third panel;

attaching said third panel to said second hat channel by means of a plurality of penetrating connectors placed through said large flange and terminating in said third panel;

placing rear edge of a fourth panel in abutted contact with front edge of said second panel such that exposed portions of symmetric connectors located along front edge of second panel are fully received into said recesses in said rear edge of said fourth panel and further positioning said fourth panel adjacent to said second hat channel such that inner face of said fourth straw panel covers a portion of the outer surface of said spine channel, and;

attaching said fourth panel to said second hat channel by means of a plurality of penetrating connectors placed through said spine channel and terminating in said fourth panel.

10. The improved method for constructing a wall of claim 9, further comprising the step of providing said symmetric recesses with adhesive prior to inserting symmetric connectors therein.

* * * * *